Feb. 16, 1971     D. B. FOSTER     3,563,666
AUTOMATIC INSPECTION OF PROFILES
Filed Sept. 9, 1968     2 Sheets-Sheet 1

Inventor
D. B. FOSTER
By
Holcombe, Wetherill & Brisebois
Attorney

United States Patent Office 3,563,666
Patented Feb. 16, 1971

3,563,666
AUTOMATIC INSPECTION OF PROFILES
David B. Foster, Windlesham, England, assignor to North Atlantic Research Products Limited, London, England, a British company
Filed Sept. 9, 1968, Ser. No. 758,313
Claims priority, application Great Britain, Sept. 11, 1967, 41,446/67
Int. Cl. G01b *11/24;* G01m *13/02*
U.S. Cl. 356—168            1 Claim

ABSTRACT OF THE DISCLOSURE

This invention relates to automatic inspection of profiles regularly projecting from a body, examples of which are the inspection of screw threads or gear teeth. In accordance with the invention, a magnified image of the profile is projected onto a receiving surface that includes pairs of photoelectric cells disposed in positions relatively indicative of undersize and oversize dimensions of an ideal profile. These photoelectric cells then establish a decision in electronic logical circuits to which they are connected that the profile is within predetermined gauging limits. A "read now" signal is announced to the logical circuits by a trigger device also disposed in or on said surface.

---

In the specification of my prior U.S. Pat. No. 3,365,-699, is described means for the photoelectrical logical determination of dimensions and shape-recognition of moving objects.

The present application relates to a further development of that system for the automatic inspection of gear wheel teeth profiles and of the profiles of screw threads together, optionally with a determination that the correct number of individual profiles is present.

The invention consists in a method for the automatic inspection of a profile regularly projecting from a body, e.g., a screw thread or gear tooth, which method comprises projecting a magnified image of the profile into a receiving surface that includes pairs of photoelectric cells disposed in positions relatively indicative of undersize and oversize dimensions of an ideal profile, to establish a decision in electronic logical circuits that the profile is within predetermined gauging limits, and announcing a "read now" signal to said logical circuits by a trigger device also disposed in or on said surface.

The invention also consists in a system for the automatic inspection of a profile regularly projecting from a body, e.g., a screw thread or a gear tooth, which system comprises a receiving surface to receive a magnified image of a profile to be inspected, pairs of photoelectric cells disposed in or on said surface in positions relatively indicative of undersize and oversize dimensions of an ideal profile, an electronic logical circuit means connected to said pairs of photocells to receive and process dimensional information signals therefrom, and a trigger device in or on said surface to announce a "read now" signal to said logical circuit means.

Figure 1:
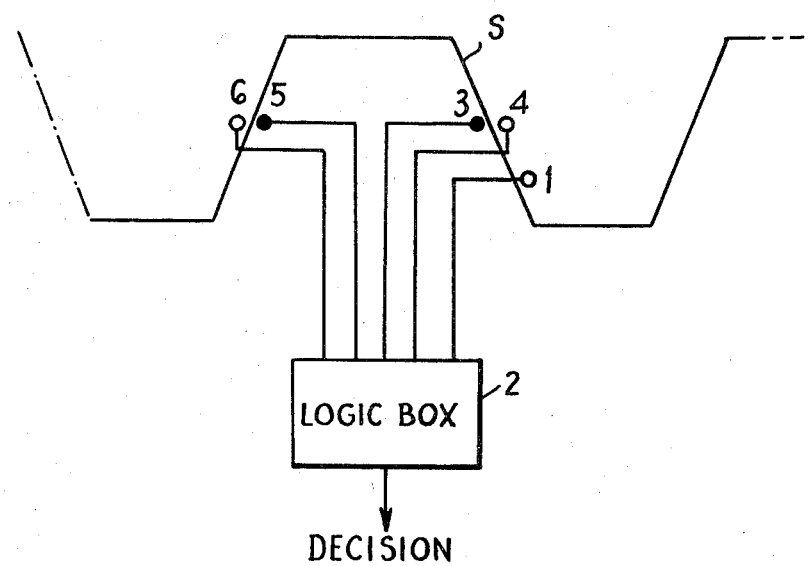
Figure 2:
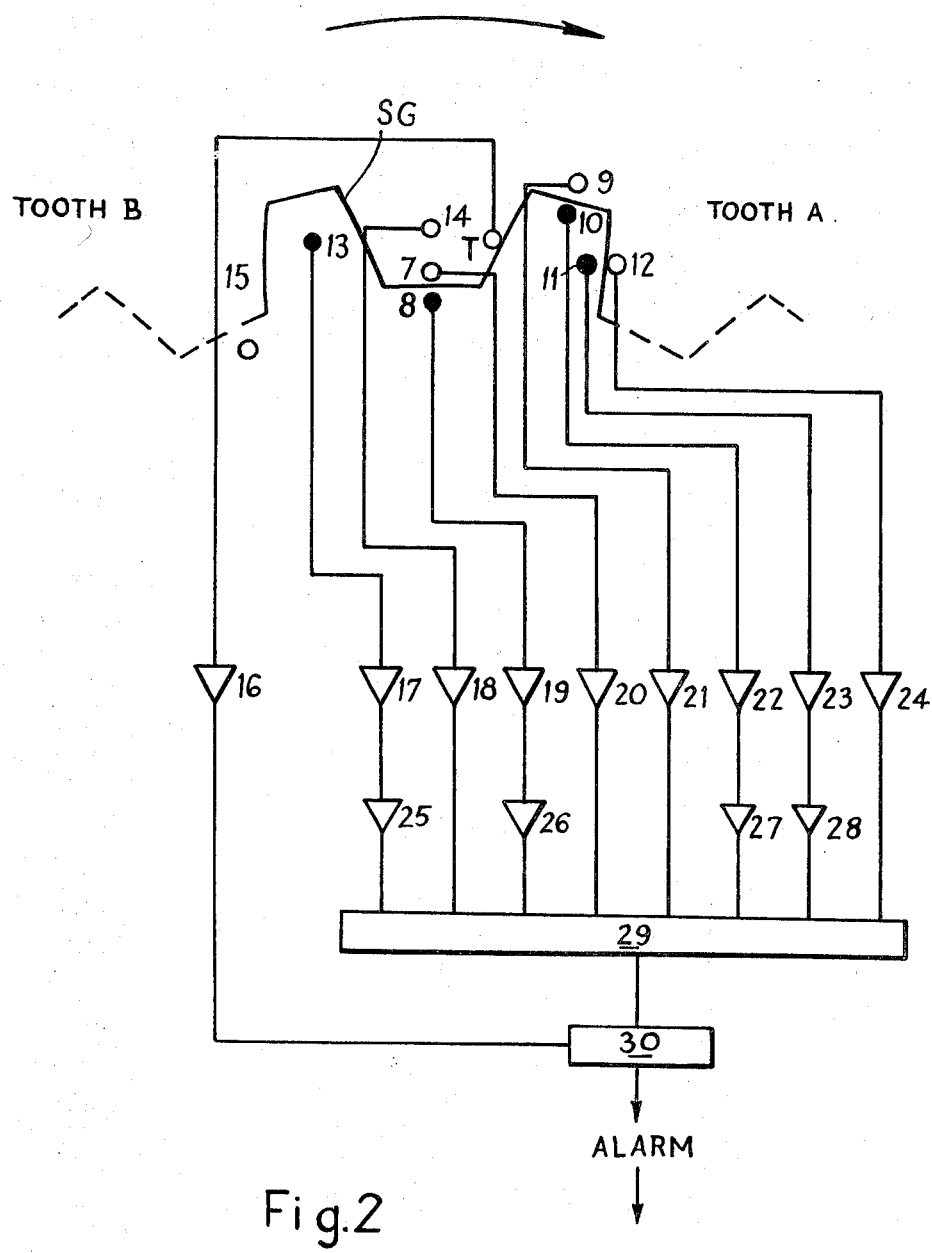

In order that the invention may be more clearly understood, reference will now be made to the accompanying drawings, showing two embodiments thereof by way of example, and in which:

FIG. 1 shows diagrammatically a system for the automatic inspection of a screw thread profile, and FIG. 2 shows diagrammatically a system for the automatic inspection of a gear tooth profile.

Referring first to screw thread profiles, the system consists of a magnifying shadowgraph of the type well known in the art, and therefore not illustrated, which produces a magnified image of the profile of the screw thread.

Referring to the accompanying drawing, read in the light of the teachings of the aforementioned patent specification No. 3,365,699, a photocell system is disposed relatively to the shadow image S and comprises a trigger cell 1 which announces the "read now" signal to a logic box 2 as referred to in the said prior specification, and pairs of cells 3, 4 and 5, 6 of which cells 3 and 5 are undersize dimension cells and cells 4 and 6 are oversize dimension cells and these cells are so disposed that if the undersize cells 3 and 5 are dark and not illuminated whilst the oversize cells 4 and 6 are light and illuminated, it establishes the decision in electronic logical circuits that the profile is within predetermined, i.e., correct, gauging limits.

It will be clear that any number of such pairs of gauging cells can be arranged around the profile of the screw form shadow to check automatically that such points of the screw profile are or are not within correct gauging limits and preferably such pairs will relate to the pitch circle dimension, to the tip dimension and to the root dimension all measured in the linear axis of the screw, and furthermore it may also be desirable to inspect by such means for the root diameter and the tip diameter in the direction at right angles to the axis of the screw.

All such dimensional gaugings can be made by a simultaneous logical decision at the same "read now" time established by the trigger cell and in accordance with the techniques described in the aforementioned specification No. 3,365,699.

The invention also provides conventional mechanical translation means to move the shadow image of the screw along the magnified shadow-graph screen so that each turn of the screw is dimensionally inspected in turn. This arrangement has, however, not been specifically illustrated as it will be well understood by those skilled in the art.

A similar system can be used for the automatic inspection of the teeth of gear wheels by interpreting the principle in terms of rotational rather than linear motion, the rotation being about the central axis of a gear wheel and the shadowgraph image thus rotating related to systems of pairs of gauging cells and a single trigger "read now" cell.

A typical system for this purpose is shown in FIG. 2 in which the pair of cells 7 and 8 relate to the gauging of the tooth root from the shadowgraph SG, the pair of cells 9 and 10 relate to the gauging of the tooth tip and the pair of cells 11 and 12 relate to gauging the pitch circle related to the common trigger cell at T which triggers the "read now" interrogation signal for all gaugings, as referred to in the prior specification No. 3,365,699.

It may also be useful to check that all gear teeth are present and this is carried out by the addition of two photocells 13 and 14 which register respectively the presence of the next gap and the next tooth into the logical circuit means at the same time as the given tooth is being gauged.

Thus, should a tooth be missing then the system will produce an appropriate alarm signal.

Should it also be required to count the actual number of teeth present then the gear wheel should be provided with a distinct hole, e.g., as at 15 and with a separate trigger and cell arrangement (not shown) so that on rotation of the gear wheel the presence of the hole 15 is detected by this separate trigger cell and then each decision made as to the correctness of teeth and as triggered by the cell T sets up a count until the second trigger cell signals that a complete revolution has been made. The total count can then be compared with a standard count, for example, in a countdown system as known in the art, to check that the total count of actual teeth agrees with the number which should be present.

In FIG. 2 the references 16 to 24 inclusive show Schmitt trigger amplifiers or differential amplifiers to give an unambiguous signal as to light or dark state of the cell and inversion amplifiers 25 to 28 inclusive to convert logical "0" into logical "1" signals for taking to a common AND gate at 29 with an electronic memory 30 set into accept or reject state by the AND gate being interrogated at the "read now" time from the trigger cell T.

I claim:
1. A system for the automatic inspection of a profile regularly projecting from a body, which system comprises a receiving surface, means for projecting a magnified image of a profile to be inspected onto said surface, a plurality of pairs of photoelectric cells responsive to said image and disposed in positions relative to said surface such that signals emitted thereby are indicative of undersize and oversize relationships between the dimensions of said profile to be inspected and an ideal profile, electronic logical circuit means connected to said pairs of photocells to receive and process dimensional information signals therefrom, a trigger device positioned to annnounce a "read now" signal to said logical circuit means when said image is in a predetermined position relative to said surface, and an additional pair of photocells located in positions relative to said surface in which they emit signals indicative of the presence of a next gap and a nexet profile, said additional photocells being connected to transmit the signals emitted thereby to said logical circuit means at the same time that the profile itself is being inspected.

References Cited

UNITED STATES PATENTS

| | | | |
|---|---|---|---|
| 1,480,390 | 1/1924 | Hartness | 356—165 |
| 2,400,501 | 5/1946 | Gilbert | 356—165 |
| 2,433,558 | 12/1947 | Hurley, Jr. | 356—168 |
| 2,949,057 | 8/1960 | Polidor | 356—165 |
| 3,365,699 | 1/1968 | Foster | 356—167 |
| 3,395,794 | 8/1968 | Petry | 250—222X |
| 3,480,141 | 11/1969 | Rock, Jr. | 356—156 |

FOREIGN PATENTS

| | | | |
|---|---|---|---|
| 1,452,776 | 1966 | France | 356—156 |
| 1,465,159 | 1966 | France | 356—165 |
| 35,714 | 1965 | Germany | 356—165 |

RONALD L. WIBERT, Primary Examiner

J. ROTHENBERG, Assistant Examiner

U.S. Cl. X.R.

73—162; 250—222; 356—156